US008514558B2

(12) United States Patent
Song

(10) Patent No.: US 8,514,558 B2
(45) Date of Patent: Aug. 20, 2013

(54) HINGE ASSEMBLY AND PORTABLE DEVICE HAVING THE SAME

(75) Inventor: Chang-Jin Song, Seoul (KR)

(73) Assignee: Pantech Co., Ltd., Seoul (KR)

( * ) Notice: Subject to any disclaimer, the term of this patent is extended or adjusted under 35 U.S.C. 154(b) by 429 days.

(21) Appl. No.: 12/646,011

(22) Filed: Dec. 23, 2009

(65) Prior Publication Data

US 2010/0299873 A1     Dec. 2, 2010

(30) Foreign Application Priority Data

Jun. 1, 2009   (KR) ........................ 10-2009-0048196

(51) Int. Cl.
*E05D 7/00*      (2006.01)
*H04M 1/00*      (2006.01)
*H05K 5/00*      (2006.01)
*H05K 7/00*      (2006.01)

(52) U.S. Cl.
USPC .............. 361/679.27; 361/679.56; 455/575.3; 16/284; 16/354

(58) Field of Classification Search
USPC .............. 361/679.02, 67.26, 679.27, 679.55, 361/679.56; 455/575.1–575.4; 16/221, 223, 16/233, 255–259, 277–294, 354
See application file for complete search history.

(56) References Cited

U.S. PATENT DOCUMENTS

| | | | | |
|---|---|---|---|---|
| 4,825,395 A | * | 4/1989 | Kinser et al. | 361/679.09 |
| 5,363,089 A | * | 11/1994 | Goldenberg | 340/7.63 |
| 5,987,704 A | * | 11/1999 | Tang | 16/354 |
| 6,374,089 B1 | * | 4/2002 | Till | 455/90.1 |
| 6,519,812 B2 | * | 2/2003 | Ko et al. | 16/354 |
| 6,574,837 B2 | * | 6/2003 | Jantschek | 16/371 |
| 6,636,419 B2 | * | 10/2003 | Duarte | 361/679.09 |
| 6,900,981 B2 | * | 5/2005 | Kuivas et al. | 361/679.06 |
| 6,917,824 B2 | * | 7/2005 | Kobayashi | 455/575.3 |
| 6,925,684 B2 | * | 8/2005 | Kang et al. | 16/264 |
| 7,140,074 B2 | * | 11/2006 | Han et al. | 16/366 |
| 7,225,002 B2 | * | 5/2007 | Lee et al. | 455/575.4 |
| 7,345,872 B2 | * | 3/2008 | Wang | 361/679.55 |
| 7,353,053 B2 | * | 4/2008 | Prichard et al. | 455/575.4 |
| 7,363,065 B2 | * | 4/2008 | Lee | 455/575.3 |
| 7,469,156 B2 | * | 12/2008 | Kota et al. | 455/575.4 |
| 7,512,426 B2 | * | 3/2009 | Maatta et al. | 455/575.1 |
| 7,636,592 B2 | * | 12/2009 | Kim et al. | 455/575.4 |
| 7,729,730 B2 | * | 6/2010 | Zuo et al. | 455/575.1 |
| 7,813,123 B2 | * | 10/2010 | Kuwajima et al. | 361/679.56 |
| 7,916,473 B2 | * | 3/2011 | Jang | 361/679.55 |

(Continued)

FOREIGN PATENT DOCUMENTS

| | | |
|---|---|---|
| KR | 10-0533038 | 12/2005 |
| KR | 1020060075803 | 7/2006 |
| KR | 1020080109493 | 12/2008 |
| KR | 1020100059465 | 6/2010 |

*Primary Examiner* — Adrian S Wilson
(74) *Attorney, Agent, or Firm* — H.C. Park & Associates, PLC

(57) ABSTRACT

A portable device includes a first body element, a second body element, and a hinge assembly to allow the second body element to slide and rotate, and to vary the vertical arrangement between the first body element and the second body element while remaining parallel to each other. The hinge assembly has a first end rotatably coupled to the first body element and a second end rotatably and slidably coupled to the second body element to allow the first body element and the second body element to slide and vary the vertical arrangement therebetween while staying parallel to each other.

15 Claims, 10 Drawing Sheets

(56) References Cited

U.S. PATENT DOCUMENTS

| | | | |
|---|---|---|---|
| 7,983,725 B2* | 7/2011 | Zhang et al. | 455/575.4 |
| 8,024,019 B2* | 9/2011 | Miyaoka | 455/575.4 |
| 8,032,987 B2* | 10/2011 | Oshima et al. | 16/354 |
| 8,208,249 B2* | 6/2012 | Chin et al. | 361/679.27 |
| 2001/0009847 A1* | 7/2001 | Kim et al. | 455/90 |
| 2001/0031644 A1* | 10/2001 | Eromaki | 455/550 |
| 2003/0109230 A1* | 6/2003 | Duarte et al. | 455/90 |
| 2003/0172495 A1* | 9/2003 | Pan | 16/292 |
| 2004/0198477 A1* | 10/2004 | Jung et al. | 455/575.4 |
| 2005/0049019 A1* | 3/2005 | Lee | 455/575.4 |
| 2005/0050686 A1* | 3/2005 | Kurokawa | 16/354 |
| 2005/0155182 A1* | 7/2005 | Han et al. | 16/336 |
| 2005/0225934 A1* | 10/2005 | Homer et al. | 361/683 |
| 2005/0272487 A1* | 12/2005 | Lee | 455/575.4 |
| 2005/0288076 A1* | 12/2005 | Seol | 455/575.4 |
| 2006/0068859 A1* | 3/2006 | Lee et al. | 455/575.4 |
| 2006/0146011 A1* | 7/2006 | Pihlaja et al. | 345/156 |
| 2007/0004476 A1* | 1/2007 | Lee | 455/575.4 |
| 2007/0054710 A1* | 3/2007 | Pan | 455/575.3 |
| 2007/0197270 A1* | 8/2007 | Kim | 455/575.4 |
| 2007/0226955 A1* | 10/2007 | Cho et al. | 16/354 |
| 2008/0109995 A1* | 5/2008 | Kuwajima et al. | 16/354 |
| 2009/0011802 A1* | 1/2009 | Malthe et al. | 455/575.1 |
| 2009/0013500 A1* | 1/2009 | Ueyama et al. | 16/354 |
| 2009/0070961 A1* | 3/2009 | Chung et al. | 16/354 |
| 2009/0075707 A1* | 3/2009 | Lee | 455/575.4 |
| 2009/0093285 A1* | 4/2009 | Weng et al. | 455/575.4 |
| 2010/0087232 A1* | 4/2010 | Yeh et al. | 455/575.4 |

\* cited by examiner

HINGE ASSEMBLY AND PORTABLE DEVICE HAVING THE SAME

CROSS REFERENCE TO RELATED APPLICATION

This application claims priority from and the benefit of Korean Patent Application No. 10-2009-0048196, filed on Jun. 1, 2009, which is hereby incorporated by reference for all purposes as if fully set forth herein.

BACKGROUND

1. Field of Disclosure

The following disclosure relates to a hinge assembly and a portable device having the same, and more particularly, to a hinge assembly to vary the arrangement of a portable device and the portable device employing the hinge assembly.

2. Discussion of the Background

Generally, portable devices are small, can be carried by hand and can be operated while moving. Example of portable devices include but are not limited to a personal digital assistance (PDA), an electronic scheduler, a mobile phone, and a navigation device. Portable devices have been developed to implement functions such as reproduction of multimedia including terrestrial broadcasting, music and moving pictures and global positioning system (GPS) map searching, in addition to typical communication functions such as voice calls and radio calls.

Some portable devices may be classified as, for example, sliding-type devices and folding-type devices according to the way they open and operate. The sliding type portable device may include a body, a slider unit, and a hinge assembly which connects the body and the sliding together and permits them to slide relative to each other, generally in the length direction. In addition, generally, a keypad is provided on the body and a display unit is provided on each of a folding unit of a folding-type device and a slider unit of a sliding-type device. In the sliding-type portable device, when the slider unit is slid away from the body, there is a step from an upper surface of the body to the upper surface of the slider unit. As the result, keys on the keypad that are arranged adjacent to the step may be more difficult for a user to accurately press.

SUMMARY

Exemplary embodiments of the present invention provide a hinge assembly to vary the vertical arrangement while maintaining a parallel arrangement of a first plate and a second plate.

Additional features of the invention will be set forth in the description which follows, and in part will be apparent from the description, or may be learned by practice of the invention.

An exemplary embodiment of the present invention discloses a hinge assembly coupled between a first plate and a second plate of a portable device. The hinge assembly includes a base element; a first rotation element including a first rotational axel, which is coupled to the first plate and is rotatably coupled to the base element, and a first gear coupled to the first rotational axel; a second rotation element including a second rotational axel, which is coupled to the second plate and is rotatably coupled to the base element, and a second gear coupled to the second rotational axel; a power transfer gear rotatably coupled to the base element and arranged to transfer rotation torque between the first gear and the second gear; and an elastic module to restrict rotation of the base element relative to the first rotation element. Further, rotation of the hinge assembly causes a vertical arrangement between the first plate and the second plate to vary while maintaining a parallel arrangement of the first plate and the second plate.

An exemplary embodiment of the present invention discloses a portable device including a first body element having a first thick portion and a first thin portion; a second body element having a second thick portion and a second thin portion, the second thick portion to contact the first thin portion and the second thin portion to contact the first thick portion if the portable device is in a closed position; and a hinge assembly having a first end rotatably coupled to the first body element and a second end rotatably and slidably coupled to the second body element, the hinge assembly to rotate the portable device between an open position and a closed position, and to vary the vertical arrangement between the first body element and the second body element while maintaining a parallel arrangement of the first body element and the second body element.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
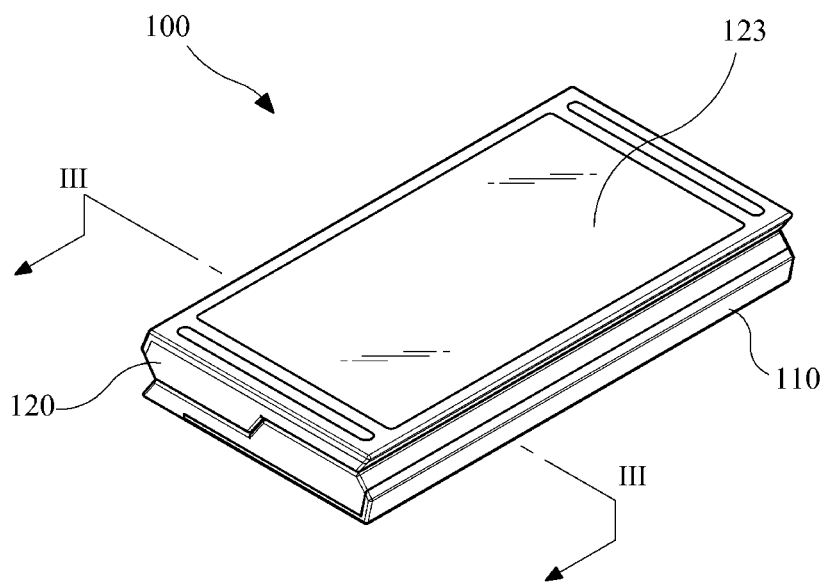
FIG. 1 is a perspective view illustrating a portable device according to an exemplary embodiment of the present invention in a closed position.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the shape, size, and relative sizes of regions may be exaggerated for clarity. Like reference numerals in the drawings denote like elements.

The terminology used herein is for the purpose of describing particular embodiments only and is not intended to be limiting of this disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, exemplary embodiments will be described in detail with reference to the accompanying drawings.

Figure 2:
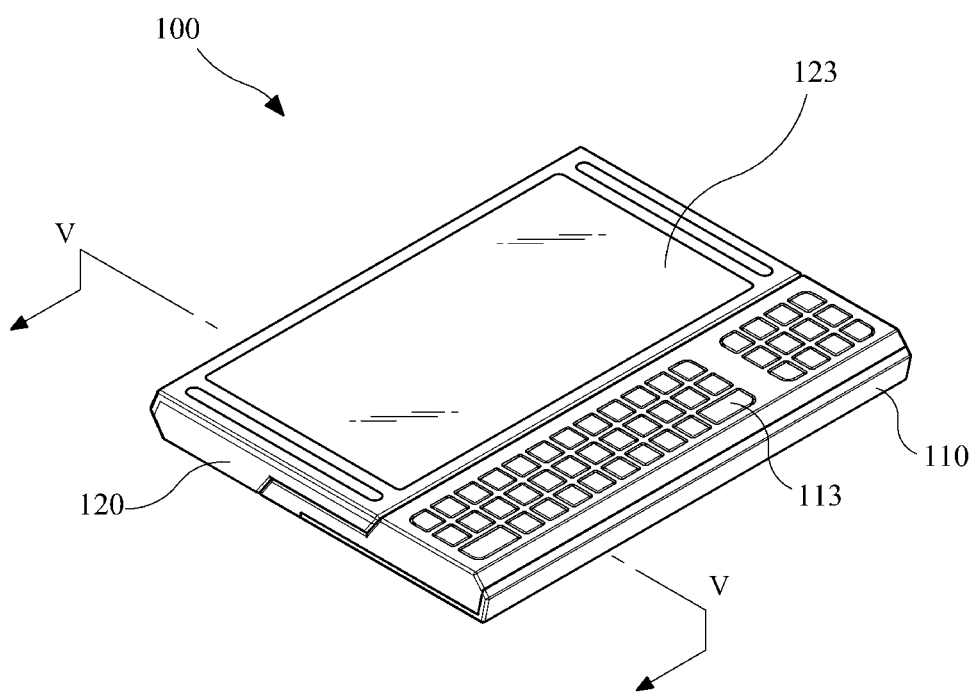
FIG. 2 is a perspective view illustrating a portable device according to an exemplary embodiment of the present invention in an open position.
Figure 3A:
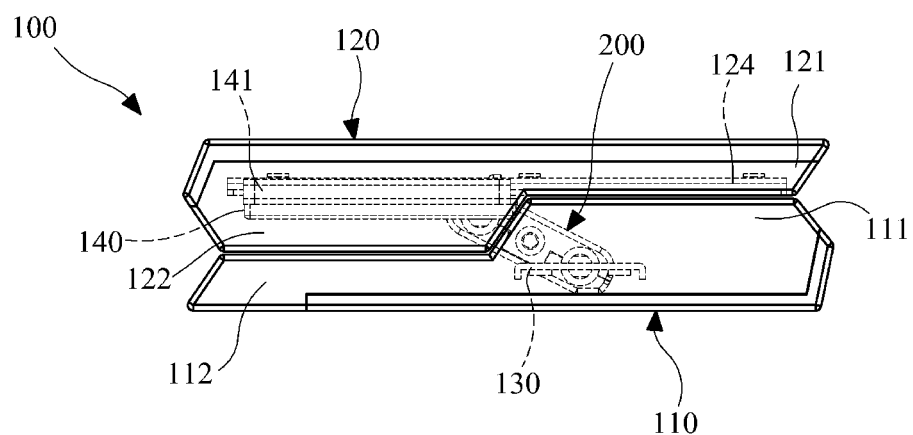
FIG. 3A is a cross-sectional view as taken along line III-III of FIG. 1.
Figure 3B:
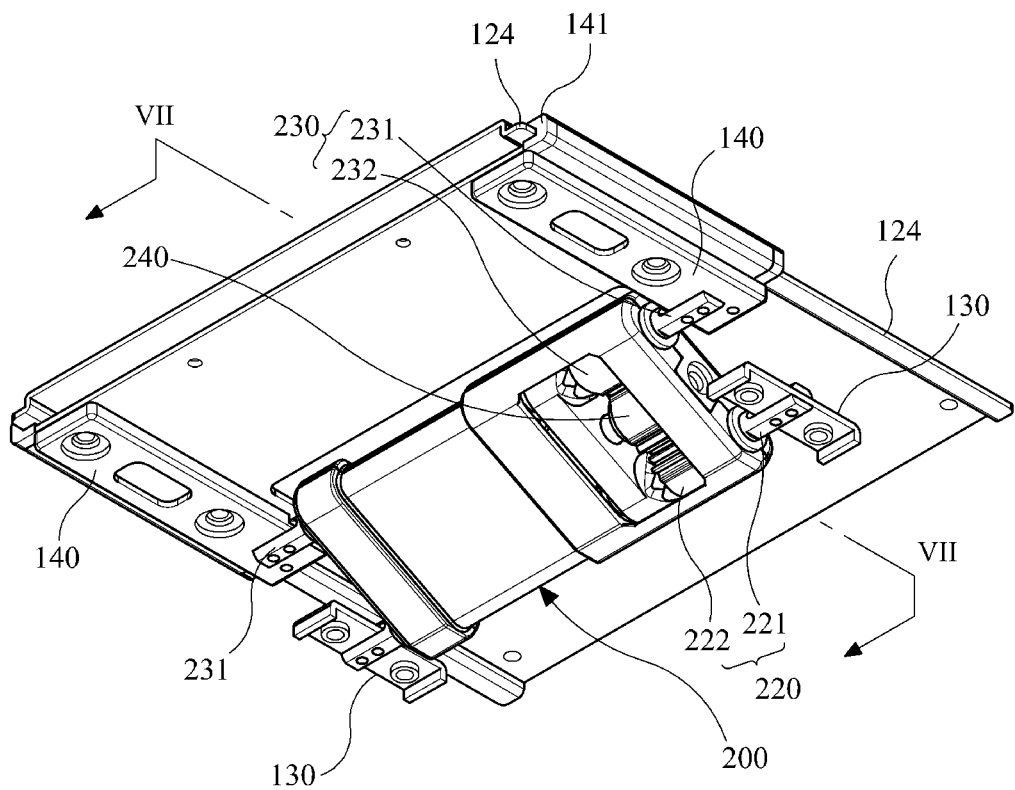
FIG. 3B is a perspective view illustrating a hinge assembly according to an exemplary embodiment of the present invention.

FIG. 1 is a perspective view illustrating a portable device in a closed position according to an exemplary embodiment of the present invention, FIG. 2 is a perspective view illustrating a portable device in an open position according to an exemplary embodiment of the present invention, and FIG. 3A is a cross-sectional view as taken along line III-III of FIG. 1. FIG. 3B is a perspective view illustrating a hinge assembly according to an exemplary embodiment of the present invention.

Referring to FIG. 1, FIG. 2, and FIG. 3A, a portable device 100 includes a first body element 110, a second body element 120, and a hinge assembly 200. For convenience of explanation, the first body element 110 is described as a bottom part of the portable device 100, and the second body element 120 is described as the top part of the portable device 100. However, this is only for convenience of explanation, and it is possible that the first body element 110 is the top part and the second body element 120 is the bottom part of the portable device 100.

An upper side of the first body element 110 includes a step. In more detail, the upper side of the first body element 110 includes a first thick portion 111 and a first thin portion 112. The first thick portion 111 protrudes above the first thin portion 112 by a predetermined height. The first thick portion 111 and the first thin portion 112, which may be formed as integral parts, may have their upper sides connected by a sloped portion.

The second body element 120 also includes a step that may correspond with the step in the first body element 110. Thus, the lower side of the second body element 120 may fit together with the upper side of the first body element 110, and contacts the upper side of the first body element 110 if the portable device 100 is in a closed position such as shown in FIG. 1 and FIG. 3A. As shown, the lower side of the second body element 120 includes a second thin portion 121 and a second thick portion 122. The second thin portion 121 contacts the first thick portion 111 of the first body element 110 if the portable device 100 is in a closed position. The second thick portion 122 protrudes below the second thin portion 121, and contacts the first thin portion 112 of the first body element 110 if the portable device 100 is in a closed position. If the upper sides of the first thick portion 111 and the first thin portion 112 are connected by a sloped portion, the lower sides of the second thin portion 121 and the second thick portion 122 may also be connected by an equivalent sloped portion. The sloped portions of the first body element 110 and the second body element 120 allow the first body element 110 and the second body element 120 to fit together without a gap or with a reduced gap. In addition, the second body element 120 is may be coupled to the hinge assembly 200 in a manner that permits the second body element 120 to slide with respect to the first body element 100. If the portable device 100 configured as described above is opened via the hinge assembly 200, the second body element 120 may slide with respect to the first body element 110 and vary the vertical arrangement between the first body element 110 and the second body element 120.

As shown, the hinge assembly 200 has a first end rotatably coupled to the first body element 110 and a second end rotatably and slidably coupled to the second body element 120, thus permitting the first body element 110 and the second body element 120 to vary their relative vertical arrangement while remaining parallel to each other. A more detailed description of the hinge assembly 200 will be described later.

Hereinafter, operations of the portable device 100 configured as described above will be described with reference to drawings.

As shown in FIG. 3A and FIG. 3B, if the portable device 100 is in a closed position, the upper side of the first body element 110 contacts the lower side of the second body element 120 such that the first thick portion 111 contacts the second thin portion 121, and the first thin portion 112 contacts the second thick portion 121. Consequently, the portable device 100 is in a closed position.

Figure 4A:
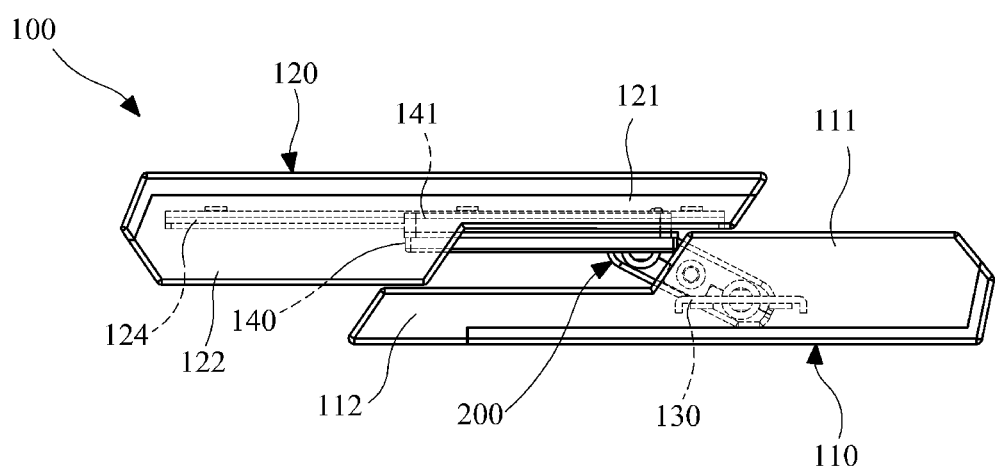
FIG. 4A is a cross-sectional view as taken along line III-III with the device in a partially opened position.
Figure 4B:
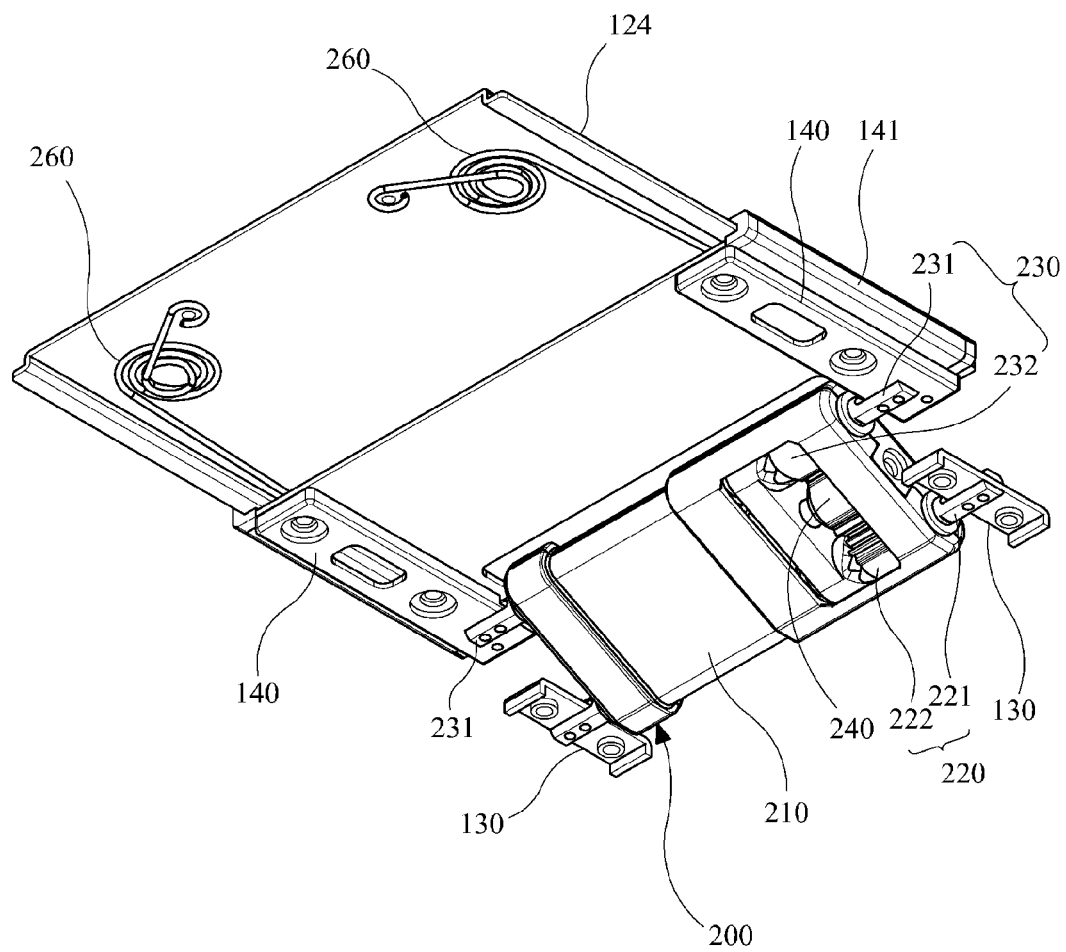
FIG. 4B is a perspective view illustrating a hinge assembly according to an exemplary embodiment of the present invention.

FIG. 4A is a cross-sectional view as taken along line III-III with the device in a partially opened position. FIG. 4B is a perspective view illustrating a hinge assembly according to an exemplary embodiment of the present invention.

If the portable device 100 is in a partially opened position, as shown in FIG. 4A and FIG. 4B, the first body element 110 and the second body element 120 rotate about the hinge assembly 200 to vary their relative vertical arrangement while remaining parallel to each other. Additionally, the second body element 120 may slide with respect to the first body element 110.

Figure 5A:
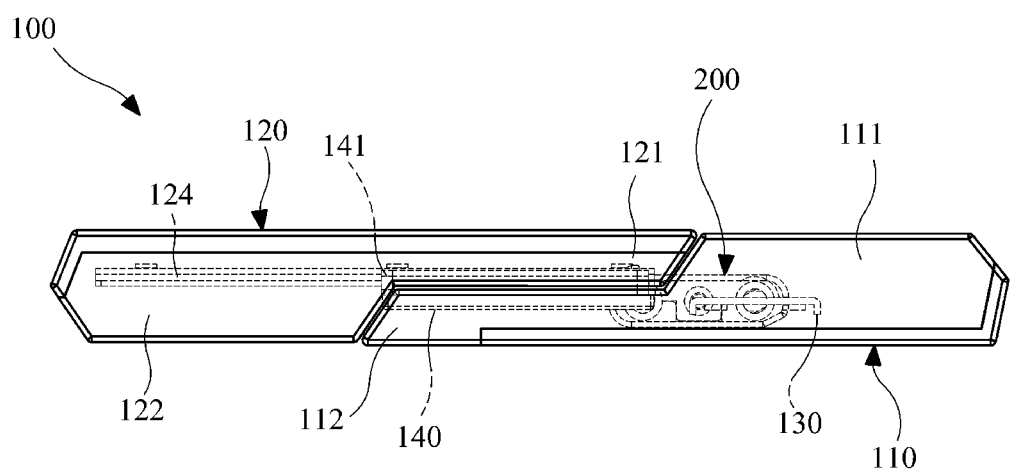
FIG. 5A is a cross-sectional view as taken along line V-V of FIG. 2.
Figure 5B:
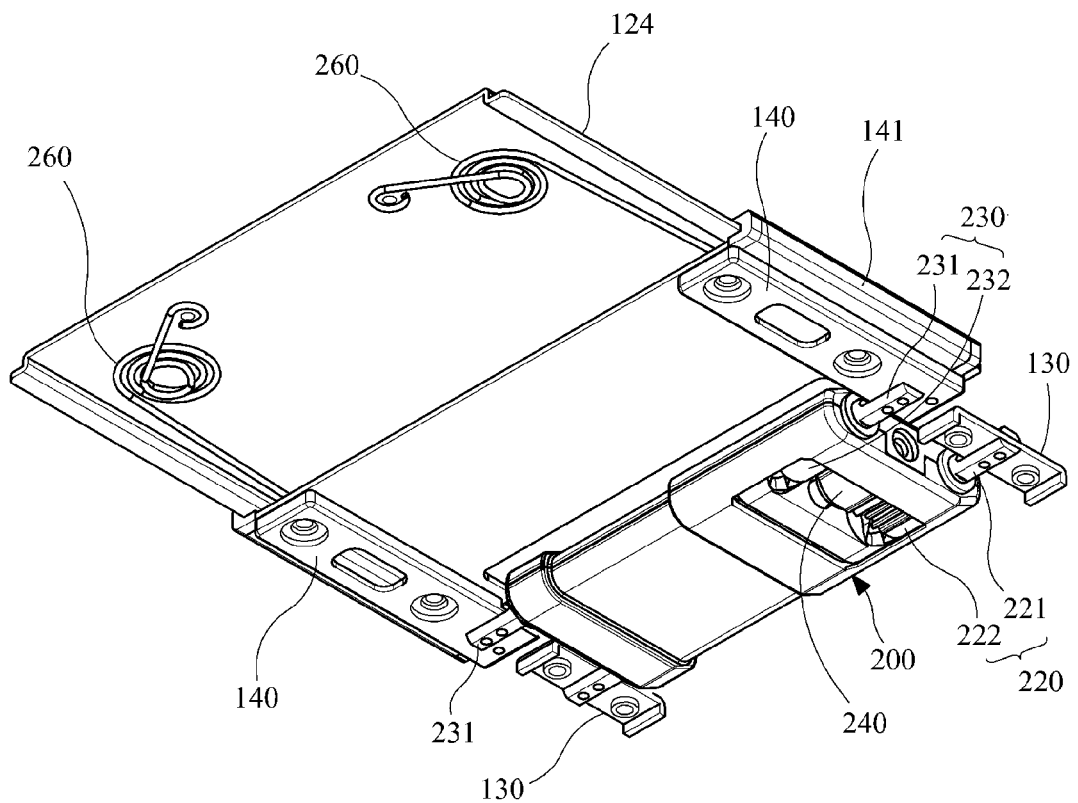
FIG. 5B is a perspective view illustrating a hinge assembly according to an exemplary embodiment of the present invention.

FIG. 5A is a cross-sectional view as taken along line V-V of FIG. 2. FIG. 5B is a perspective view illustrating a hinge assembly according to an exemplary embodiment of the present invention.

Once the second body element 120 is slid away from the first body element 110, or while the second body element 120 is being slid, as shown in FIG. 5A and FIG. 5B, the vertical arrangement between the second body element 120 and the first body element 110 is varied by the hinge assembly 200 so that the upper surface of the first thin portion 112 of the first body element 110 contacts the lower surface of the second thin portion 121 of the second body element 120. As shown in FIG. 5A, the portable device 100 is in an open position.

Referring to FIG. 5A, the distance that the first thick portion 111 protrudes from the first thin portion 112 may be the same as the thickness of the second thin portion 121, and the distance that the second thick portion 122 protrudes from the second thin portion 121 may be the same as the thickness of the first thin portion 112. Hence, when the second body element 120 is slid with respect to the first body element 110, and the first thin portion 112 of the first body element 110 contacts the second thin portion 121 of the second body element 120, a top surface of the first body element 110 (defined by the top surface of the first thick portion 111) and a top surface of the second body element 120 may be positioned on the same plane, and a bottom surface of the first body element 110 and a bottom surface of the second body element 120 (defined by the second thick portion 122) may also be positioned on the same plane. Accordingly, the portable device 100 may be bar-shaped in an open position.

Referring back to FIG. 1 and FIG. 2, a display unit 123 may be arranged on a top surface of the second body element 120. Additionally, a keypad 113 may be arranged on a top surface of the first body element 110. Therefore, if the portable device 100 is in an open position, a user can operate the keypad unit 113 while viewing the display unit 123. Further, there may be a smaller step or no step adjacent to the keypad 113 so that use of the keypad 113 by the user may be more convenient. Furthermore, if the portable device 100 is in a closed position, the keypad unit 113 can be hidden from view and protected from being operated, regardless of a user's intention, due to contact from other objects which are carried together with the portable device 100 in the user's pocket, bag, or the like. Additionally, if the display unit 123 is arranged on the top surface of the second body element 120, the user can check an operating status of the portable device 100 or view images or video through the display unit 123 even while the portable device 100 is in a closed position.

Alternatively, although not shown, a display unit may be arranged on a bottom surface of the first body element 110 and a keypad unit may be arranged on the second thick portion 122 of the second body element 120.

The first body element 110 and the second body element 120 may be connected together by a flexible printed circuit (not shown) or a cable (not shown), and an image signal to drive the display unit 123 may be transmitted from the first body element 110 to the second body element 120 via the flexible printed circuit or cable. The flexible printed circuit or the cable may transfer an electric signal input from the keypad unit 113 via a processor and/or memory to the second body element 120. However, the method of connecting the first body element 110 and the second body element 120 is not limited to the above-described.

Referring back to FIGS. 5A and 5B again, the portable device 100 may further include a semi-automatic sliding module 260. The semi-automatic sliding module 260 slides the second body element 120 semi-automatically relative to second plates 140. Examples of the semi-auto sliding module 260 include a torsion spring. The torsion spring may have a first end fixed to a second plate 140 and a second end fixed to the second body element 120. More than one torsion sprint may be used.

If the portable device is in a closed position, the semi-automatic sliding module 260 may operate as follows. If a user moves the second body element 120 away from the first body element 110 by a distance that is less than a threshold distance, the second body element 120 returns to an initial position, i.e., the closed position, due to elasticity of the torsion spring. If the user moves the second body element 120 away from the first body element 110 by a distance that is greater than the threshold distance, the second body element 120 is automatically moved away from the first body element 110 into an open position due to the elasticity of the torsion spring. This example of the semi-automatic sliding module 260 also explains the term "semi-automatically."

In contrast, if the portable device is in an open position, the semi-automatic sliding module 260 may operate as follows. If the second body element 120 is moved a distance less than the threshold distance toward the first body element 110, the portable device 100 returns to the initial position, i.e., the open position. If the second body element 120 is moved a distance greater than the threshold distance toward the first body element 110, the second body element 120 is automatically moved toward the first body element 110 into a closed position due to elasticity of the torsion spring. As described above, the semi-automatic sliding module 260 enables a user to open or close the portable device 100 more easily.

The portable device 100 also includes first plates 130 and the second plates 140. The first plates 130 and the second plates 140 are spaced at a predetermined distance from each other and coupled to the hinge assembly 200, such that they can vary the vertical arrangement between the first body element 110 and the second body element 120 while staying parallel to each other. The first plates 130 are coupled to the first body element 110. The first plates 130 may be secured by bolts to the first body element 110. The second plates 140 are slidably coupled to the second body element 120. One guide rail 141 may be provided to the side of each second plate 140. In addition, the second body element 120 may include slit elements 124 to is slide along the guide rails 141. The slit elements 124 are coupled to the lower surface of the second body element 120, and are spaced a predetermined distance away from the second body element 120. The slit elements 124 may be plate-shaped to be inserted into the guide rails 141.

The first plates 130 are coupled to the first body element 110, and the second plates 140 are slidably coupled to the second body element 120, so that the first body element 110 overlaps the second body element 120 when the portable device 100 is in a closed position. In addition, when the portable device 100 is moved into an open position, the second body element 120 is slid and with respect to the first body element 110 to vary the vertical arrangement therebetween, and thereby the second body element 120 may remain parallel to the first body element 110.

Figure 6:
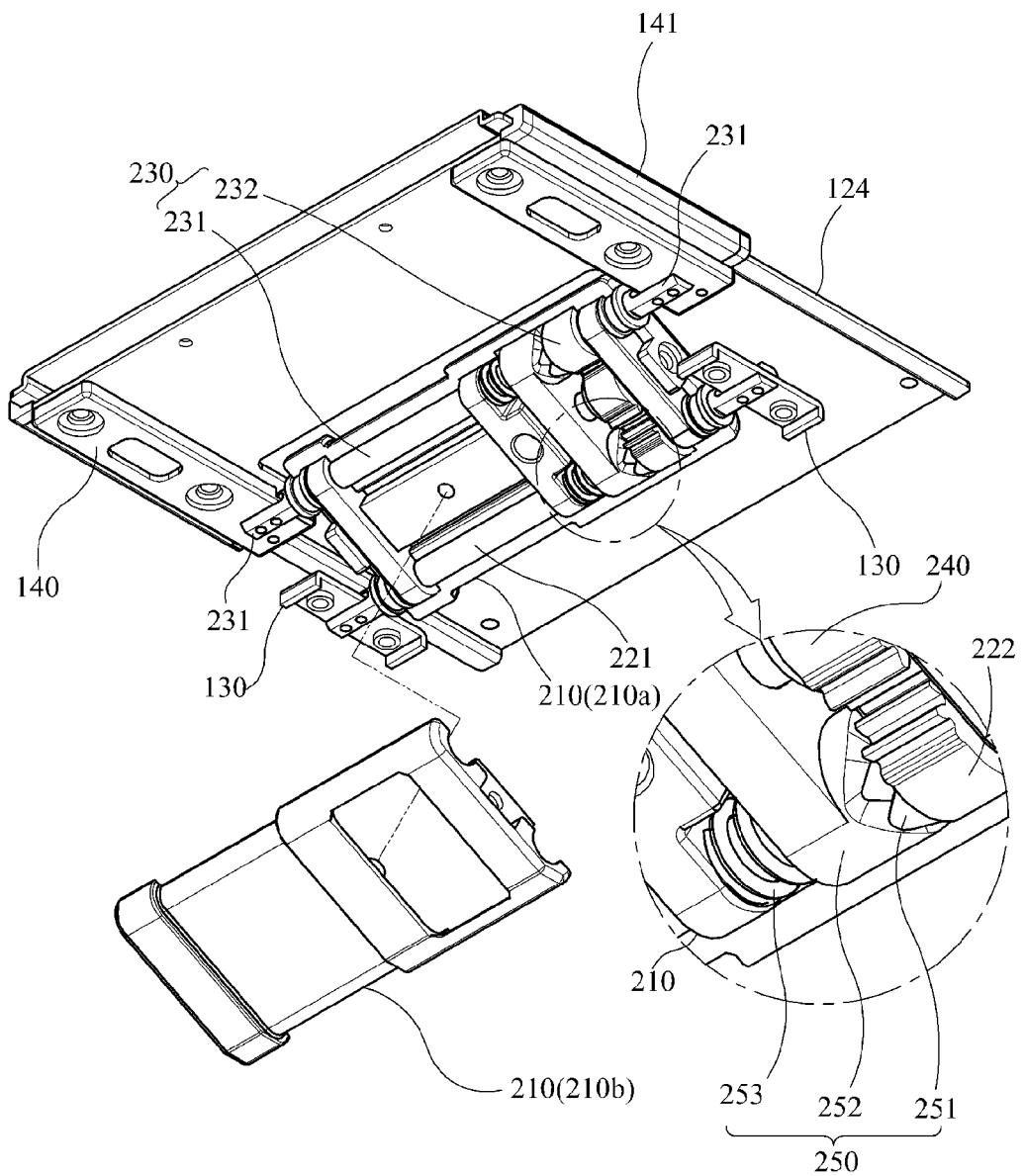
FIG. 6 is a perspective view illustrating a hinge assembly according to an exemplary embodiment of the present invention.
Figure 7:
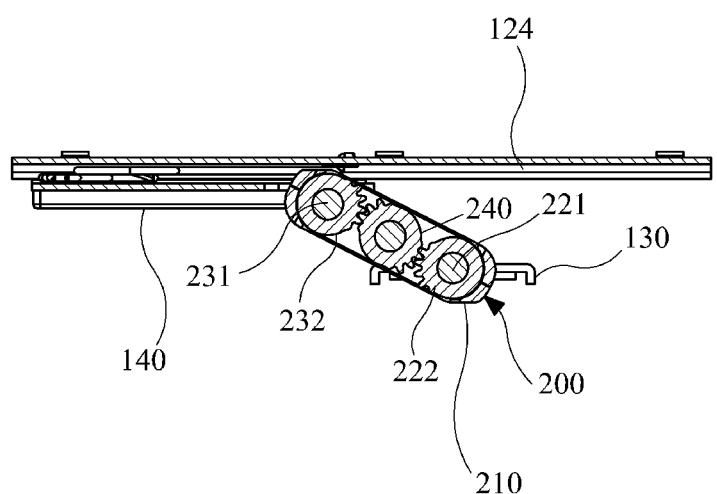
FIG. 7 is a cross-sectional view illustrating a hinge assembly according to an exemplary embodiment of the present invention.

FIG. 6 is a perspective view illustrating a hinge assembly according to an exemplary embodiment of the present invention. FIG. 7 is a cross-sectional view illustrating a hinge assembly according to an exemplary embodiment of the present invention.

A structure of the hinge assembly 200 which allows the first plates 130 and the second plates 140 to vary the vertical arrangement therebetween while remaining parallel to each other will be described with reference to FIG. 3B, FIG. 6, and FIG. 7. The hinge assembly 200 includes a base element 210, a first rotation element 220, a second rotation element 230, a power transfer gear 240, and an elastic module 250.

The base element 210 forms the exterior of the hinge assembly 200, and has an interior space which receives a first gear 222, a second gear 232, the power transfer gear 240 and the elastic module 250. The base element 210 may include two parts, such as a front housing 210(b) and a rear housing 210(a), which may facilitate the assembly and maintenance of the hinge assembly 200.

The first rotation element 220 includes a first rotational axel 221 and the first gear 222. The first rotational axel 221 is coupled to the first plates 130. To couple the first rotational axel 221 to the first plates 130, the first rotational axel 221 may have grooves at both ends and the first plates 130 may be inserted into the respective grooves. In conjunction with or separately from the grooves, bolts may be used to fix the first rotational axel 221 to the first plates 130. The first gear 222 is rotatably coupled to the base element 210, and coupled to the first rotational axel 221. The first gear 222 may be integrated with the first rotational axel 221, and the first gear 222 and the first rotational axel 221 may be individually provided and coupled together.

The second rotation element 230 includes a second rotational axel 231 and a second gear 232. The second rotational axel 231 is coupled to the second plates 140. The second gear 232 is rotatably coupled to the base element 210, and coupled to the second rotational axel 231. That is, the second gear 232 rotates together with the second rotational axel 231.

The power transfer gear 240 is rotatably coupled to the base element 210, and is interposed between the first gear 222 and the second gear 232 to transfer rotation torque to or between the first gear 222 and the second gear 232. In the hinge assembly 200, the first rotation element 220, the power transfer gear 240, and the second rotation element 230 are sequentially coupled to one another by gears, and thus, the first rotation element 220 and the second rotation element 230 rotate in the same direction. That is, if the first rotation element 220 rotates clockwise, the second rotation element 230 also rotates clockwise, and if the first rotation element 220 rotates counterclockwise, the second rotation element 230 rotates counterclockwise.

Each of the first gear 222, the second gear 232, and the power transfer gear 240 may have gear teeth arranged partially on the circumference as shown in FIG. 7. This is because is when the vertical arrangement between the first body element 110 is varied relative to the second body element 120, a rotation angle of the first gear 222 may not exceed about 90 degrees, and the second gear 232 which rotates engaged with the first gear 222 via the power transfer gear 240 has the same rotation degree. Therefore, even if gear teeth are only arranged on a region of the circumference of the first gear 222 which is engaged with the power transfer gear 240, a region of the circumference of the second gear 232 which is engaged with the power transfer gear 240, and regions of the circumference of the power transfer gear 240 which are engaged with the first and second gears 222 and 232, the hinge assembly 200 is able to operate normally. In addition, according to the above structure, the thickness of the hinge assembly 200 can be reduced by the height of the gear teeth, and thus a slimmer hinge assembly 200 may be achieved.

The elastic module 250 generates elasticity in order to promote contact between the cam elements 252 and the protrusions 251, which are described in more detail below. This may prevent the first plates 130 and the second plates 140 from being rotated due to their own weight, and enables the first plates 130 and the second plates 140 to semi-automatically rotate due to an external force when moving relative to each other. The elastic module 250 prevents the first plates 130 and the second plates 140 from rotating until a force more than a predetermined amount is applied to overcome the elastic module 250 elasticity and permit the protrusions 251 to rotate past the cam elements 252. For example, when the portable device 100 is in an open position due to an external force and thus the second body element 120 and the first body element 110 are positioned parallel to each other, the first plates 130 and the second plates 140 are positioned on the same plane. At this time, the elastic module 250 maintains the portable device 100 in an open position unless a force greater than the elasticity of the elastic module 250 is applied. Additionally, when the portable device 100 is in a closed position, portable device 100 stays in a closed position due to the elastic module 250, which permits the cam elements 252 to prevent unrestricted rotation of the protrusions 251, such as might occur otherwise by the self-weight of the first body element 110 and the second body element 120. The structure of the elastic module 250 for the above operation will be described later.

The rotation ratio between the first gear 222 and the second gear 232 may be 1:1.

If the portable device 100 is opened or closed, the first plates 130 coupled to the first body element 110 and the second plates 140 coupled to the second body element 120 will rotate while staying parallel to each other. Thus, the first rotation element 220 and the second rotation element 230 rotate at the same angular rate. That is, the rotation ratio between the first gear 222 and the second gear 232 is 1:1, such that when the first gear 222 rotates 30 degrees in a unit of time, the second gear 232 also rotates 30 degrees in the same unit of time. In this case, a rotation ratio between the first gear 222 and the power transfer gear 240 may be the same as a rotation ratio between the second gear 232 and the power transfer gear 240. For example, if a rotation ratio between the first gear 222 and the power transfer gear 240 is 1:2, a rotation ratio between the second gear 223 and the power transfer gear 240 is to be 1:2, so that the rotation ratio between the first gear 222 and the second gear 232 is 1:1. That is, a rotation ratio between the first gear 222, the power transfer gear 240, and the second gear 223 may be 1:X:1. For example, the rotation ratio between the first gear 222, the power transfer gear 240, and the second gear 232 may be 1:1:1. Thus, the first gear 222, the power transfer gear 240, and the second gear 232 may have the same size, and thereby the hinge assembly 200 can be minimized and the first gear 222, the power transfer gear 240, and the second gear 232 rotate together while smoothly being engaged with one another.

The elastic module 250 may include a protruding portion 251, a cam element 252, and an elastic element 253.

The protruding portion 251 is arranged on at least one of the first gear 222, the second gear 232, and the power transfer gear 240. The protruding portion 251 may be arranged on a side surface of at least one of the first gear 222, the second gear 232, and the power transfer gear 240, where the side surface contacts the cam element 252. The protruding portion 251 may be arranged only on the first gear 222, or arranged on each of the first gear 222, the second gear 232, and the power transfer gear 240. If the protruding portion 251 is arranged on each of the first gear 222, the second gear 232, and the power transfer gear 240, the three pairs of protruding portions 251 and corresponding cam elements 252 may operate as the elastic module 250.

The cam element 252 may be disposed in the base element 210 to contact the protruding portion 251. A surface of the cam element 252 includes a cam profile, which contacts the protruding portion 251. While the first rotation element 220 and the second rotation element 230 are rotating, the protruding portion 251 moves along the cam profile such that the first rotation element 220 and the second rotation element 230 can semi-automatically rotate relative to each other, and rotation can be prevented without sufficient force to overcome the elastic element 253, which maintains contact between the cam element 252 and the protruding portion 251. The cam element 252 is coupled to the first rotational axel 221 or the second rotational axel 231 and moves along a length of the first rotational axel 221 or the second rotational axel 231 when the hinge assembly 200 rotates. Alternatively, the cam element 252 may be coupled to an additional axel provided in the base element 210 to move along the additional axel when the hinge assembly 200 rotates.

The elastic element 253 is disposed opposite to the protruding portion 251 with the cam element 252 interposed therebetween, and supports the cam element 252 against the protruding portion 251. That is, the elastic element 253 has an end contacting an inner wall of the base element 210 and the other end contacting the cam element 252 of the elastic element 253. Elasticity is applied to the cam element 252 toward the protruding portion 251. The elastic element 253 may be a compression spring.

When the portable device 100 is in a closed position, if the elastic module 250 rotates the second body element 120 more than a threshold angle relatively to the first body element 110, the portable device 100 may be automatically opened. In addition, when the portable device 100 is in an open position, if the elastic module rotates the second body element 120 more than the threshold angle relatively to the first body element 110, the portable device 100 may be automatically closed. Moreover, the elastic module 250 allows the first rotation element 220 and the second rotation element 230 to be stably rotated without shaking with respect to the base element 210.

While the exemplary embodiments have been shown and described, it will be understood by those skilled in the art that various changes in form and details may be made thereto without departing from the spirit and scope of this disclosure as defined by the appended claims and their equivalents.

In addition, many modifications can be made to adapt a particular situation or material to the teachings of this disclosure without departing from the essential scope thereof. Therefore, it is intended that this disclosure not be limited to the particular exemplary embodiments disclosed as the best mode contemplated for carrying out this disclosure, but that this disclosure will include all embodiments falling within the scope of the appended claims and their equivalents.

What is claimed is:

1. A hinge assembly coupled between a first plate and a second plate of a portable device, comprising:
   a base element;
   a first rotation element comprising a first rotational axle, which is coupled to the first plate and is rotatably coupled to the base element, and a first gear coupled to the first rotational axle;
   a second rotation element comprising a second rotational axle, which is coupled to the second plate and is rotatably coupled to the base element, and a second gear coupled to the second rotational axle;
   a power transfer gear rotatably coupled to the base element and arranged to transfer rotation torque between the first gear and the second gear such that the first gear rotates in a same direction as the second gear; and
   an elastic module to restrict rotation of the base element relative to the first rotation element,
   wherein rotation of the hinge assembly causes a vertical arrangement between the first plate and the second plate to vary while maintaining a parallel arrangement of the first plate and the second plate.

2. The hinge assembly of claim 1, wherein a rotation ratio between the first gear and the second gear is 1:1.

3. The hinge assembly of claim 1, wherein the elastic module comprises:
   a protruding portion arranged on at least one of the first gear and the power transfer gear;
   a cam element disposed to contact the protruding portion and having a cam profile formed thereon to enable the first rotation element and the second rotation element to vary the vertical arrangement between the first plate and the second plate semi-automatically, and
   an elastic element disposed opposite to the protruding portion with the cam element interposed therebetween and to elastically compress the cam element toward the protruding portion.

4. A portable device, comprising:
   a first body element comprising a first thick portion and a first thin portion;
   a second body element comprising a second thick portion and a second thin portion, the second thick portion to contact the first thin portion, and the second thin portion to contact the first thick portion if the portable device is in a closed position; and
   a hinge assembly comprising a first end rotatably coupled to the first body element and a second end rotatably and slidably coupled to the second body element, the hinge assembly to rotate the portable device between an open position and a closed position, and to vary the vertical arrangement between the first body element and the second body element while maintaining a parallel arrangement of the first body element and the second body element by rotating the first end in a same direction as the second end.

5. The portable device of claim 4, further comprising:
   a first plate coupled to the first body element and a second plate slidably coupled to the second body element, the first plate and the second plate to rotate about the hinge assembly while remaining parallel to each other.

6. The portable device of claim 5, wherein the hinge assembly comprises:
   a base element;
   a first rotation element comprising a first rotational axle, which is coupled to the first plate and is rotatably coupled to the base element, and a first gear coupled to the first rotational axle;
   a second rotation element comprising a second rotational axle, which is coupled to the second plate and is rotatably coupled to the base element, and a second gear coupled to the second rotational axle;
   a power transfer gear rotatably coupled to the base element and arranged to transfer rotation torque between the first gear and the second gear; and
   an elastic module to restrict rotation of the base element relative to the first rotation element,
   wherein rotation of the hinge assembly causes a vertical arrangement between the first plate and the second plate to vary while maintaining a parallel arrangement of the first plate and the second plate.

7. The portable device of claim 5, further comprising:
   a semi-automatic sliding module to semi-automatically slide the second body element relative to the second plate.

8. The portable device of claim 7, wherein the semi-automatic sliding module comprises a torsion spring.

9. The portable device of claim 8, wherein the torsion spring comprises a first end coupled to the second plate and a second end coupled to the second body element.

10. The portable device of claim 4, wherein the second body element comprises a display unit and the first body element comprises a keypad unit.

11. The portable device of claim 10, wherein the display unit is arranged on a top surface of the second body element, and the keypad unit is arranged on the first thick portion of the first body element.

12. The portable device of claim 4, wherein the first body element comprises a display unit, and the second body element comprises a keypad unit.

13. The portable device of claim 12, wherein the display unit is arranged on a bottom surface of the first body element, and the keypad unit is arranged on the second thick portion of the second body element.

14. The hinge assembly of claim 1, wherein the power transfer gear rotates in an opposite direction from the direction of the first gear and the second gear.

15. The portable device of claim 6, wherein the power transfer gear rotates in an opposite direction from the direction of the first end and the second end.

* * * * *